US005242179A

United States Patent [19]

Beddome et al.

[11] Patent Number: 5,242,179

[45] Date of Patent: Sep. 7, 1993

[54] FOUR-LINE EXERCISING ATTACHMENT FOR WHEELCHAIRS

[75] Inventors: David W. Beddome, North Tonawanda; William H. Macy, Williamsville; Joseph C. Mollendorf, Amherst; Kenneth L. Peebles, Lancaster; Thomas G. Dressing, Rochester, all of N.Y.

[73] Assignee: Research Foundation of the State University of New York, Albany, N.Y.

[21] Appl. No.: 775,228

[22] Filed: Oct. 11, 1991

[51] Int. Cl.[5] .................... B62M 1/12; B62M 3/02; A63B 21/00

[52] U.S. Cl. .................... 280/233; 280/234; 280/250.1; 280/304.1; 474/134; 482/62

[58] Field of Search .................. 280/250.1, 304.1, 230, 280/233, 234; 482/60, 61, 62, 63; 474/84, 85, 133, 134

[56] References Cited

U.S. PATENT DOCUMENTS

| | | | |
|---|---|---|---|
| 838,228 | 12/1906 | Williams . | |
| 2,578,828 | 12/1951 | Nelson . | |
| 2,643,898 | 6/1953 | Everest et al. . | |
| 3,380,313 | 4/1968 | Bulin . | |
| 3,666,292 | 5/1972 | Barton . | |
| 3,877,725 | 4/1975 | Barroza . | |
| 3,994,509 | 11/1976 | Schaeffer . | |
| 4,316,616 | 2/1982 | Boivin . | |
| 4,354,691 | 10/1982 | Saunders et al. . | |
| 4,358,126 | 11/1982 | Mitchell et al. . | |
| 4,453,729 | 6/1984 | Lucken . | |
| 4,471,972 | 9/1984 | Young . | |
| 4,502,705 | 3/1985 | Weaver | 280/234 |
| 4,503,724 | 3/1985 | Ward . | |
| 4,506,900 | 3/1985 | Korosue . | |
| 4,523,769 | 6/1985 | Glaser . | |
| 4,560,181 | 12/1985 | Herron . | |
| 4,572,501 | 2/1986 | Durham et al. | 280/250.1 |
| 4,678,454 | 7/1987 | Gail . | |
| 4,735,431 | 4/1988 | Tait . | |
| 4,762,332 | 8/1988 | Seol . | |
| 4,811,964 | 3/1989 | Horn . | |
| 4,824,132 | 4/1989 | Moore | 280/250.1 |
| 4,840,076 | 6/1989 | Brubaker . | |
| 4,863,157 | 9/1989 | Mendel et al. . | |

FOREIGN PATENT DOCUMENTS

| | | |
|---|---|---|
| 1140181 | 1/1983 | Canada . |

*Primary Examiner*—Mitchell J. Hill

*Attorney, Agent, or Firm*—John C. Thompson

[57] ABSTRACT

A four limb exercising attachment for wheelchairs which will permit the occupant of the wheelchair to exercise all four limbs simultaneously, thereby affording proper bilateral movement of the arms and legs. The exercising attachment will also propel the wheelchair when operated in a suitable manner. The attachment may be used with most standard wheelchairs of the type having right and left front and rear wheels. The attachment includes right and left mounting assemblies, each mounting assembly being securable to the frame of a standard 4 wheel wheelchair at three or more spaced apart locations. A common input shaft will extend between the left and right mounting assemblies after they are mounted upon the wheelchair. Left and right arm-drives in the form of levers and leg-drives including foot pedals are in turn interconnected to the common input shaft in such a manner that movement of the arm levers will cause corresponding movement of the foot pedals and vice versa, which movement can be suitably synchronized. A resistance device is in turn connected to the common input shaft, which resistance device may include a propulsion assembly. Finally, steering devices are provided in the forms of manually operated brakes.

20 Claims, 8 Drawing Sheets

Fig. 8.
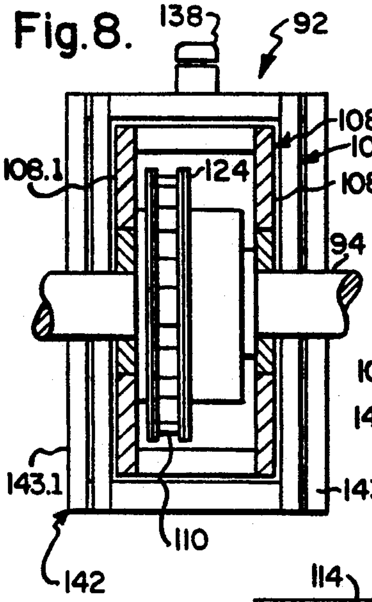
Fig. 9.
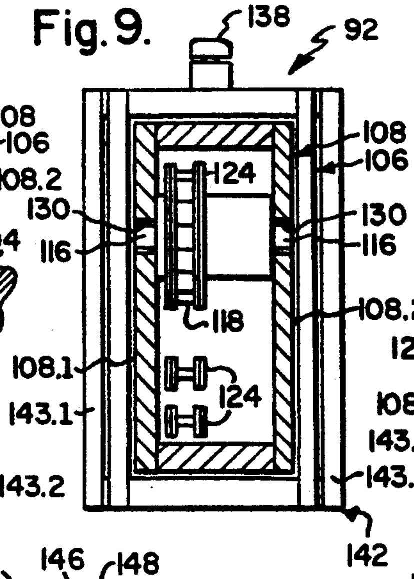
Fig. 10.
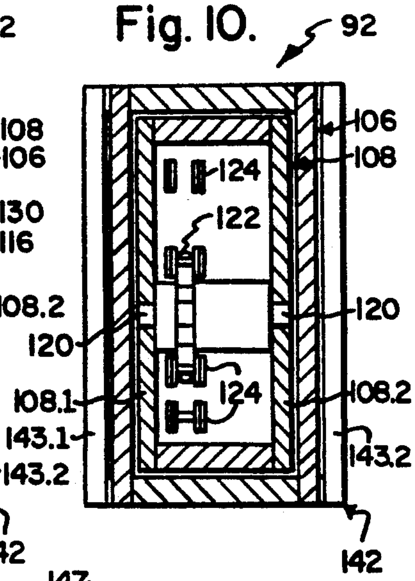
Fig. 11.
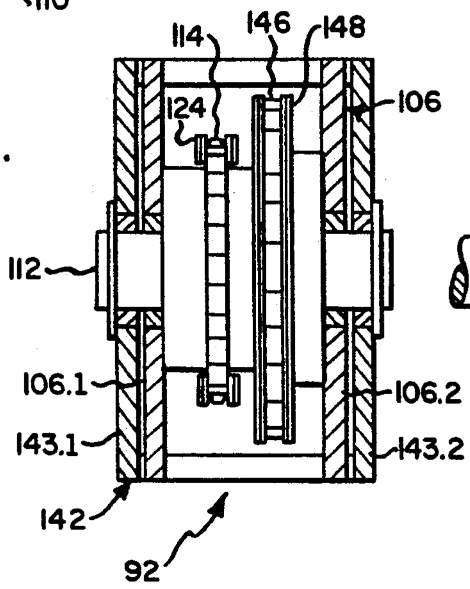
Fig. 12.
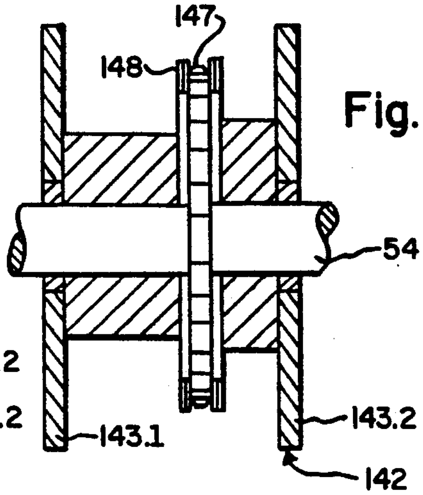
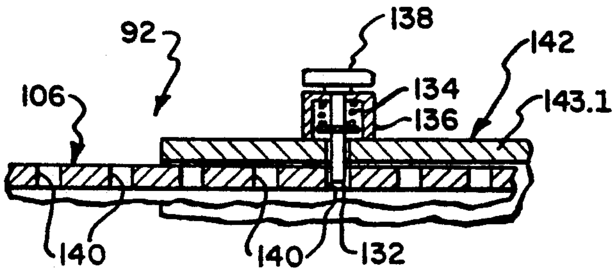
Fig. 13.

Fig. 16.
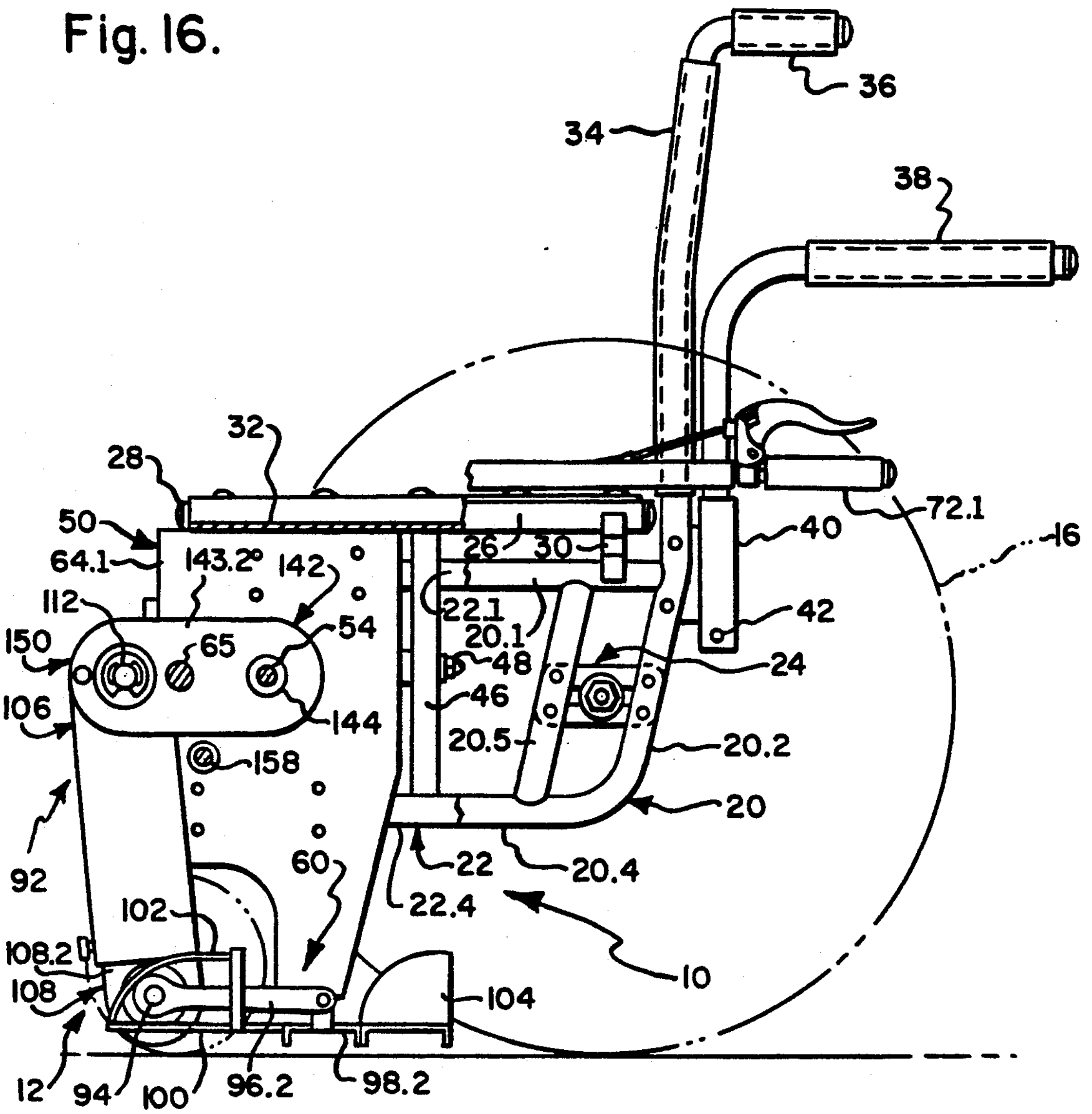
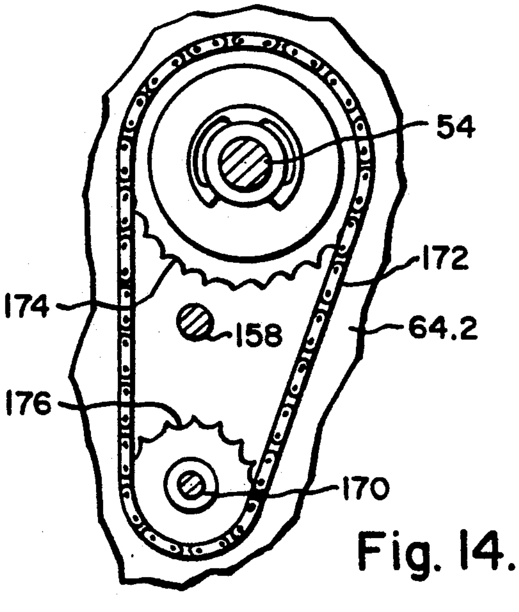
Fig. 14.
Fig. 15.
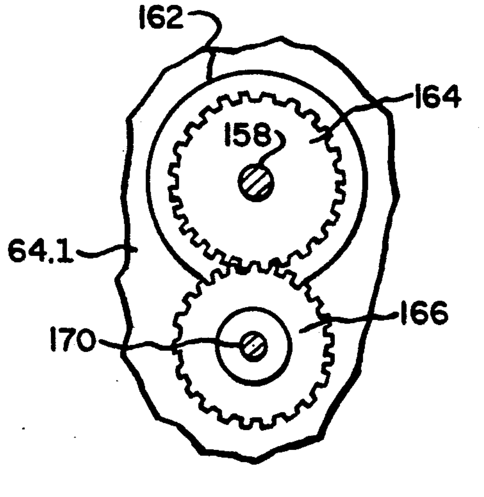

FOUR-LINE EXERCISING ATTACHMENT FOR WHEELCHAIRS

TECHNICAL FIELD

The present invention relates generally an attachment device for wheelchairs which will permit the occupant of the wheelchair to exercise all four limbs simultaneously to afford proper bilateral movement of the arms and legs. The exercising attachment will also provide for propelling the wheelchair when operated in a suitable manner.

BACKGROUND OF THE INVENTION

There are currently large numbers of wheelchair bound individuals, throughout the world, who would realize health benefits through increased exercise. These groups include, but are not limited to, the paralyzed, stroke victims, amputees, the aged, and those with cerebral palsy. These people to a large extent must rely on a wheeled device such as a wheelchair for effective mobility. This type of transportation typically fails to promote any exercise or movement of the handicapped limbs which leads to varied medical problems. Increased exercise would decrease the incidence of muscle atrophy, osteoporosis, venous stasis (poor circulation), decubitus ulcers (bed sores), and stiffening of joints. In this regard it should be noted that muscular atrophy is due to the lack of muscle activity. Similarly, the incidence of osteoporosis is also increased as a result of disuse of a limb. Venous stasis is due to the lack of muscle contractions. In a healthy limb continuous contraction of the muscle helps push the blood through the circulatory system. This is especially important in the lower limbs and the lack of muscle contractions is why the blood tends to pool in the feet and ankles of paralyzed persons leading to swelling. Decubitus ulcers are the result of pressure points (i.e., between a bone and a bed or seat) which stops the flow of blood to part of the tissue. (In a healthy person, fidgeting keeps such problems from developing.) The lack of circulation tends to lead to a breakdown of the tissue and often infection. Finally, stiffening of the joints also results from disuse of a limb. Exercise would also lead to cardiovascular conditioning and an overall increase in the quality of life. Cardiovascular deconditioning is the result of inadequate exercise and this inadequacy is due to the limited muscle mass available in the arms which inherently limits our cardiovascular exercise capability to two-thirds that of our leg cardiovascular exercise capability.

In summary it should be noted that if an individual is confined to a wheelchair and does not get proper exercise the body will deteriorate. The effect on the mental health of a person with paralysis who is slowly watching his or her body deteriorate is obviously of importance. Their efforts to maintain a positive outlook would be helped by keeping the paralyzed limbs in good shape. This would also aid in full recovery if a treatment is ever developed for the cause of their paralysis. For a person without paralysis, normal walking is sufficient to avoid experiencing any of the above symptoms.

The need for exercise has long been recognized and many differing designs have been proposed in recognition of this need. U.S. Pat. Nos. 4,316,616 and 4,471,972 have both proposed exercising attachments which can be added to the front of a wheelchair which will provide for rotational movement of the arms while at the same time causing the wheelchair to be propelled in a forward direction. U.S. Pat. Nos. 4,572,501 and 4,824,132 additionally teach not only rotational movement of the arms but also rotational movement of the feet to provide for suitable exercising, the rotational movement of the feet being achieved through a normal bike-pedal mechanism. In the four designs mentioned above, there is an insufficiency of exercising of the arms by the crank-type mechanisms illustrated. The first two patents do not teach any exercising for the legs and while the second group achieves desirable leg exercising, they do it in devices which must be disconnected from a wheelchair before the patient can be transferred to or from the wheelchair. None of the foregoing patents disclose exercising of the arms where there is almost full extension and retraction of the arms, which is considered a better form of exercise.

A large number of patents show lever devices which can be mounted on wheelchairs of either a conventional design or of a special design. These levers have an upper handgrip portion and are pivotally interconnected to the wheelchair at their lower end. In operation, these levers can be pivoted from a forward arm extended position to a retracted arm position to provide for forward movement. Representative U.S. Pat. Nos. are: 4,840,076; 4,811,964; 4,762,332; 4,735,431; 4,560,181; 4,506,900; 4,503,724; 4,453,729; 4,358,126; 4,354,691; 3,994,509; 3,877,725; 3,666,292; 2,643,898, 2,578,828; and 838,228.

All of the patents mentioned in the previous two paragraphs have various design defects, some requiring chairs of special design, and others requiring substantial modification to existing chairs. Others do not maintain bilateral motion of the arms and legs. Many designs do not permit the normal lateral transfer of the occupant to and from the wheelchair.

OBJECTS AND SUMMARY OF THE INVENTION

It is an object of the present invention to provide a four-limb exercising attachment for most standard wheelchairs of the type having right and left front and rear wheels, which attachment when properly used will provide suitable exercising for the wheelchair occupant.

A further object of the present invention is to provide an exercising attachment for most standard wheelchairs which can be attached with as few modifications as possible.

It is a further object of the present invention to provide an exercising attachment for wheelchairs which permits the leg-drive means and at least one of the arm-drive means to be stored in such a position that it would not affect normal lateral transfer (over the side of the wheelchair) or the normal use of the wheelchair.

It is a further object of the present invention to keep the weight of the entire drive as low as possible so that the wheelchair is readily transferable to or from a car, etc. This is also done for the obvious reason that a heavy wheelchair is more difficult to drive up inclines and across rough terrain (grass, dirt).

It is a further object of the present invention to provide a four-limb exercising attachment for standard wheelchairs, which exercising movement may also be used to propel the wheelchair in a forward direction, and wherein nothing is attached to the main rear wheels of the standard wheelchair. This is because the rear wheels and their attachment points are not standardized in any way. Therefore, attachment to the rear wheels would require many different designs which would limit the economies of mass production.

It is a further object of the present invention to have a direct connection between the hands and feet so that the frequency of the hand-drive can be utilized to control the frequency of the stimulation of the paralyzed limbs and to maintain bilateral movement.

A further object of the present invention is to utilize variable gearing for the drive system. The reason for this is that very low gearing may be needed to climb slopes such as wheelchair ramps, but that gearing for moving on level smooth ground should be such that the necessary number of arm and leg cycles per second are in a reasonable envelope.

It is a further object of the present invention to design a leg-drive means for adjustment to a wide range of leg lengths. This will limit the number of models necessary to fill the needs of almost anyone.

It is a further object of the present invention to keep the center of gravity of the entire wheelchair, drive system, and occupant in a reasonably low position to prevent tipping. Since a wheelchair with a drive system has a potential to travel faster than a standard wheelchair, it is desirable that it does not have a greater tendency to tip over than a standard wheelchair.

It is a further object of the present invention to provide a four-limb exercising attachment for wheelchairs wherein the drive system is fairly efficient at translating arm and leg movement into forward motion. This is desirable to permit the operation of the exercise wheelchair with people of very low strength and would also permit the wheelchair to be used for mobility purposes rather than just as an exercise machine. Physiologically speaking, this is also a desirable characteristic since it improves the user's sense of well-being.

It is a further object of the present invention to permit the effort to be applied by a single limb only while imparting motion to the other limbs in such a manner that bilateral stability is achieved.

Another object of the present invention is to design a four-limb exercising attachment for wheelchairs which would have the ability to allow exercise while sitting still. This would allow an occupant to exercise at a desk, etc., to aid circulation and thus replace normal fidgeting.

The foregoing objects and other objects and advantages of the present invention are accomplished by providing an attachment having right and left mounting assemblies, each mounting assembly being securable to the frame of a standard 4 wheel wheelchair at three or more spaced apart locations. A common input shaft will extend between the left and right mounting assemblies after they are mounted upon the wheelchair. Left and right arm-drive means in the form of levers and leg-drive means including foot pedals are in turn interconnected to the common input shaft in such a manner that movement of the arm levers will cause corresponding movement of the foot pedals and vice versa, which movement can be suitably synchronized. Resistance means are in turn connected to the common input shaft, which resistance means may include propulsion means. Finally, steering means are provided in the forms of manually operated brake means.

The foregoing design will be more fully understood after a consideration of the following detailed description taken in conjunction with the accompanying drawings in which two forms of the present invention are illustrated.

BRIEF DESCRIPTION OF THE DRAWINGS

FIGS. 8, 9, 10, 11, and 12 are sectional views taken generally along the lines 8—8, 9—9, 10—10, 11—11, and 12—12 in FIG. 4.

FIG. 13 is a sectional view showing the manner in which the leg-drive means can be held in various positions, this view being taken generally along the line 13—13 in FIG. 2.

FIGS. 14 and 15 are sectional views taken generally long the lines 14—14 and 15—15 in FIG. 3.

FIG. 16 is a fragmentary sectional view similar to the view shown in FIG. 1 but showing the leg-drive means in a stowed position and the left-hand lever means also positioned in a stowed position, the parts being shown in that position which they would occupy during lateral transfer of a user.

DETAILED DESCRIPTION

Figures 1, 1A:
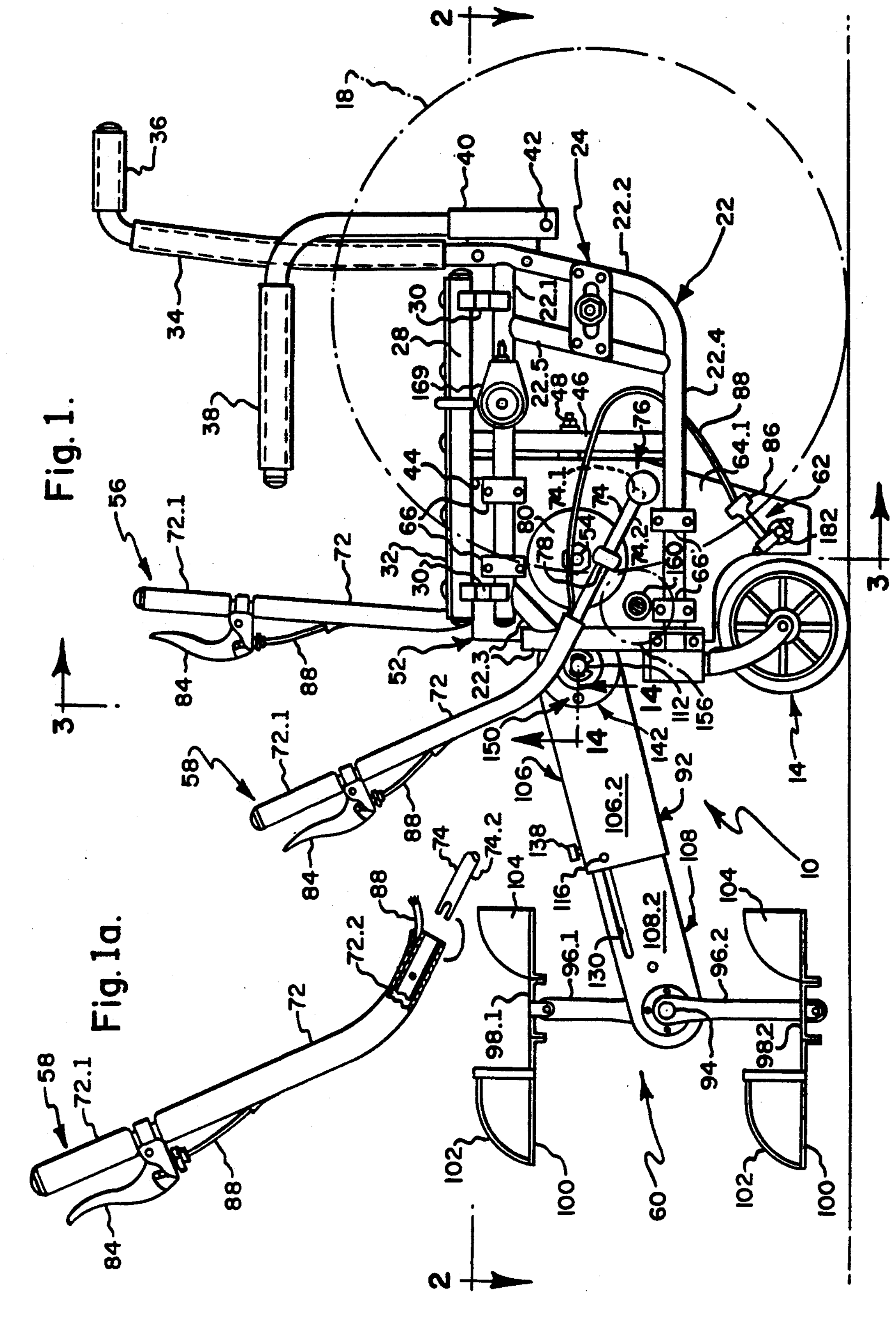
FIG. 1 is a side elevational view of a first form of the four-limb exercising attachment of this invention.
FIG. 1*a* illustrates the manner in which one of the hand levers may be disassembled prior to stowage to permit lateral transfer of the user to and from the wheelchair.

In the following detailed description right-hand and left-hand reference will be determined from standing behind the wheelchair and facing its direction of travel.

In the drawings two separate embodiments of the four-limb exercising attachment of the present invention are illustrated, both being indicated generally at 10. The first embodiment is shown in FIGS. 1 through 16, and the second embodiment is shown in FIGS. 17 through 21. As each of these designs has a number of common structural features, the same reference numerals will be applied with respect to each of the embodiments for reference to the same parts.

The attachment of each of the embodiments is designed for mounting on a more or less standard wheelchair.

The Wheelchair

In the following description a wheelchair is described of the type having front right and left caster wheels 12, 14, respectively, and rear right and left main or drive wheels 16, 18, respectively. These front and rear wheels are in turn supported on right and left frame assembly 20, 22, respectively. Each of the frame assemblies is generally rectangular having upper and lower transversely extending frame members indicated by the suffixes ".1" or "0.4", respectively, and front and rear frame members indicated by the suffixes ".3" and ".2", respectively. Each of the frame assemblies 20, 22 further includes an upwardly inclined intermediate frame member indicated by the suffix "5". In the wheelchair design illustrated right and left rear wheel mounting assemblies are indicated generally at 24, each assembly being secured to the intermediate and rear frame members 22.5 and 22.2 or 20.5 and 20.2 to adjustably mount the associated rear wheel 16 or 18 to the frame assembly 20, 22. Each wheelchair further includes right and left seat frame members 26, 28, respectively, which are mounted on the associated upper frames 20.1 or 22.1 by associated seat supports 30. A seat 32 is carried by the right and left seat frame members 26, 28. The rear frame members 20.2 and 22.2 extend above and behind the seat and a back 34 is disposed about these members. The upper end of the rear frame members 20.2, 22.2 are in turn bent backwardly and are provided with handgrips 36. Arm rests 38 are provided to either the right or the left side of the seat. In order to provide for lateral transfer of the wheelchair occupant, the arm rests are suitably telescopically received within arm rest brackets 40 mounted behind each of the right and left frame assemblies. Thus, each of the arm rests includes a vertically extending pipe-like portion the lower end of which is notched, which notched lower end rests upon a transversely extending pin 42 in the lower end of the arm rest brackets 40 so that by lifting up the arm rest 38 it can be swung 180° so that the notch in the lower end can again rest upon the pin 42. Finally, the wheelchair includes a crossbrace assembly which, in the form indicated, includes two crossing tubular members 44, 46, which crossing members are interconnected by a fastener assembly 48. The crossing frame members are conventionally pivotally secured at the their lower ends to an associated lower frame member 20.4 or 22.4, and at their upper ends they are rigidly secured to one of the right or left seat frame members 26, 28. While not shown, each of the wheelchairs will be conventionally provided with foot rests supported by the front right and left frame members 20.3, 22.3.

The wheelchair thus far described is of a generally conventional design and the first and second modifications of this invention are shown mounted on such a conventional wheelchair. However, it should be obvious that other conventional wheelchair designs may be utilized in connection with the four-limb exercise attachment of this invention.

The Attachments—In General

While two embodiments of four-limb exercising attachments are illustrated, there is a certain commonality of features between them. Thus, each of the attachments has right and left mounting assemblies 50, 52. Each of the two illustrated exercising attachments has a common input shaft 54. Each embodiment has right and left arm-drive means indicated generally at 56, 58, respectively, the arm-drive means being capable of imparting rotary motion to the input shaft 54. The right and left arm-drive means 56 and 58 are interconnected to the right and left frame assemblies 20, 22, respectively. Each of the two embodiments further includes leg-drive means indicated generally at 60, the leg-drive means being connected to the common input shaft 54 for imparting rotary motion to the input shaft. Each of the two illustrated embodiments includes steering means in the form of right and left manually operated brake means, both brake means being indicated generally at 62. Each of the two designs has resistance means, or resistance/propulsion means, but the resistance means of the two designs differ significantly. Briefly though, the resistance/propulsion means of the first embodiment shown in FIGS. 1 through 16 imparts a driving motion to the right and left rear drive wheels 16, 18 by engaging the tread of each of these wheels with right and left friction drive wheels which are mounted upon the ends of an output drive-shaft assembly which includes an intermediate differential. In the design of the embodiment illustrated in FIGS. 17 through 21, the resistance/-propulsion means includes a propulsion assembly further incorporating a fifth wheel mounted between the right and left main wheels 16, 18. The more or less common features will now be described in detail.

In both embodiments the right and left mounting assemblies each includes a metal plate 64.2 or 64.1, the metal plates being mirror images of each other. These plates are in turn secured to the upper and lower right and left frame members 20.1, 20.4, 22.1, and 22.4 by suitable fasteners. Thus, in the first embodiment saddle-bracket assemblies 66 are utilized, whereas in the second embodiment U-bolts 68 are utilized for securing purposes. The mounting plates 64.1 and 64.2 of the first embodiment are further interconnected to each other by a transversely extending bar 65 which is rigidly secured by welding or the like at its ends to the two metal plates. Suitably journaled within the metal plates 64.1 and 64.2 is the transversely extending common input shaft 54.

Right and Left Arm-Drive Means

Each of the right and left arm-drive means indicated generally at 56 and 58, respectively, includes a two part lever assembly having upper and lower parts 72, 74. The upper part includes an upper handgrip portion 72.1 movable between forward and rear positions, as somewhat indicated in FIG. 1. Each lower lever part includes a lower end portion 74.1 which is pivotally connected to an associated lever mounting assembly 76 suitably carried on one of the metal plates 64.1 or 64.2. Each lever further includes a lower intermediate portion 74.2 which is slidably received within a linear bearing 78. Linear bearing mounting means 80 are provided for mounting the linear bearing 78 for rotational movement about a transversely extending axis, such as that defined by the common input shaft, the linear bearing mounting means 80 for example being a circular disk rigidly mounted on one end of the input shaft 54 for rotation therewith. The levers 56 and 58 further include a tubular upper intermediate portion 72.2 which telescopically receives the upper end of the lower intermediate portion 74.2. These parts are so designed that they will not rotate with respect to one another when fully telescoped together but which will permit the upper intermediate portion 72.2 and the handgrip portion 72.1 to be moved upwardly away from the lower intermediate portion 74.2 to disconnect the parts to permit lateral transfer of the user to or from the wheelchair as can be seen from an inspection of FIGS. 1, la, and 16, the upper portion 72 being shown in its stowed position in FIG. 16.

Figure 3:
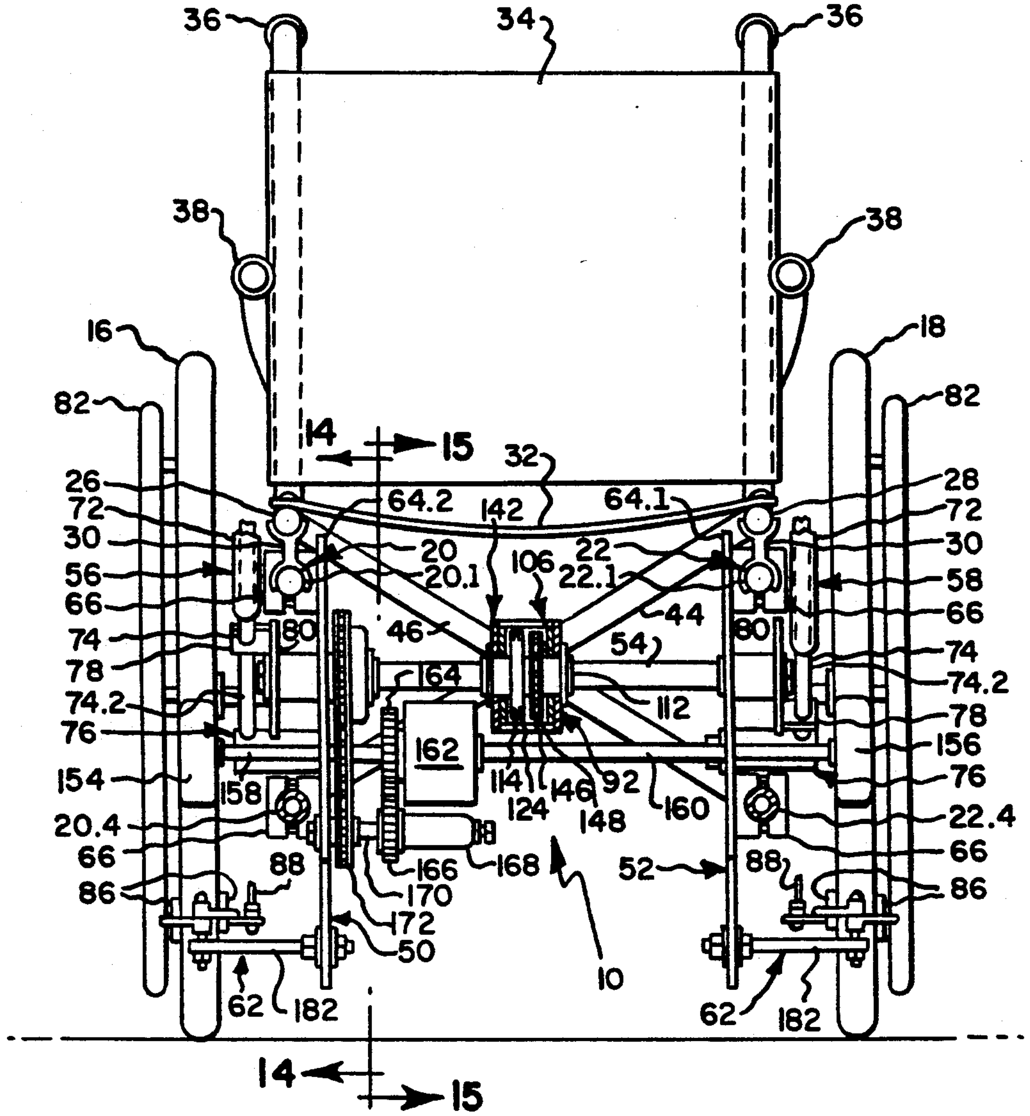
FIG. 3 is a front sectional view of the chair shown in FIG. 1, this view being taken generally along the line 3—3 in FIG. 1.
Figure 3A:
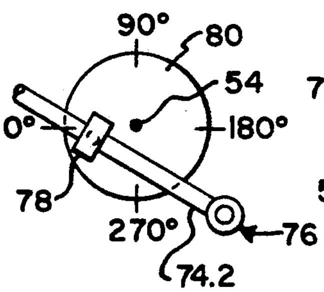
FIGS. 3*a*, 3*b*, 3*c*, and 3*d* show various driving positions of the hand lever and associate linear bearing mounting means.
Figure 3B:
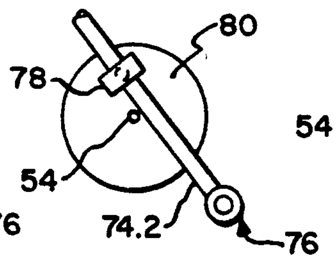
Figure 3C:
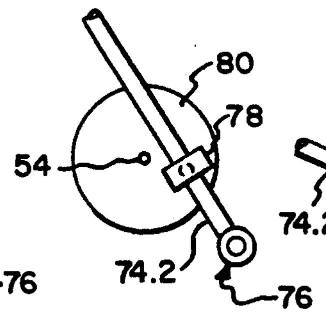
Figure 3D:
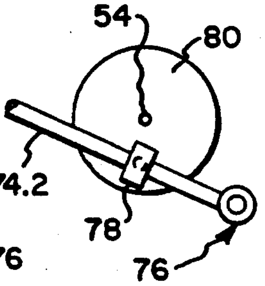
Figure 4:
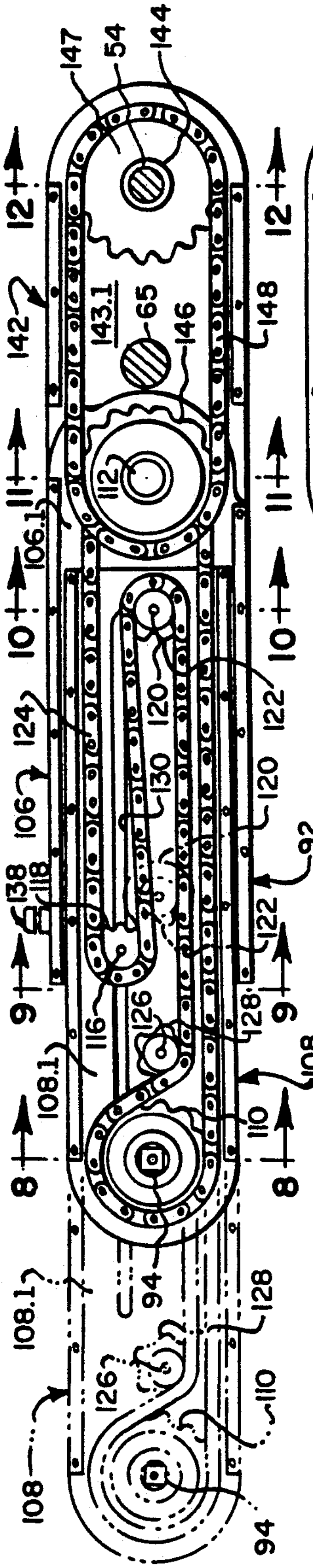
FIG. 4 is a side view of the leg-drive means a portion of its telescopic housing assembly, and a drive extension, the leg-drive means and its support housing being shown in a retracted position in full lines and in an extended position, in phantom lines.
Figure 5:
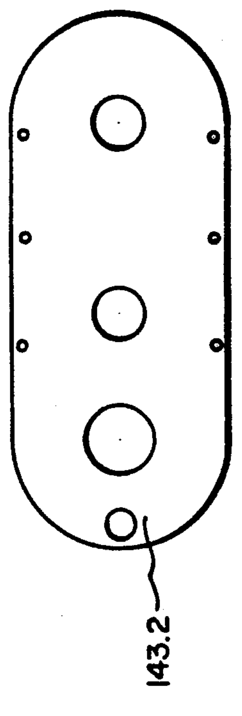
FIGS. 5, 6, and 7 show chain housing covers for the telescopic housing assembly and drive extension which are not shown in FIG. 4.
Figure 6:
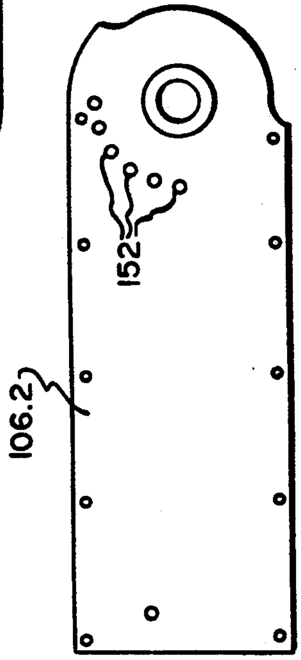
Figure 7:
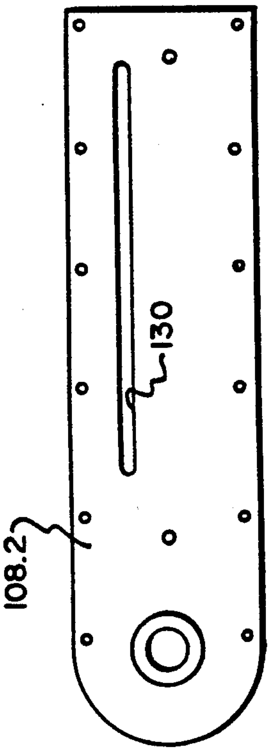

It is a feature of the arm-drives of the present apparatus that due to the design of the drives that the arm drives 56, 58 will always be maintained in a fixed relationship with each other. Thus, the common input shaft 54 extends entirely from one side of the wheelchair to the other. The disks or linear bearing mounting means 80 are rigidly secured to the shafts. Thus, each of the right and left disks will always be turned the same with respect to the other. The left linear bearing 78 is mounted 180° out-of-phase with the right linear bearing 78. This 180° out-of-phase relationship can always be maintained. (In some situations it may be desirable to alter this relationship which can be done by changing the mounting of one of the bearings on its associated disk. In addition, the distance of the linear bearing 78 from the center of rotation of the linear bearing mounting means 80, which is defined by the centerline of the shaft 54, may also be suitably varied to increase or decrease the resistance imparted to the arms by the resistance means. However, once mounted, the selected relationship will always be maintained.) It should also be noted that there is a dead space for each lever at a forward or rear position. However, the dead spaces of one lever do not coincide with the dead space of the other lever. Thus, with reference to FIGS. 3*a* through 3*d* it can be seen that when a lever is engaging the linear bearing at its forwardmost position as shown in FIG. 3*c*, which for convenience will be referred to as a 0° position, that rearward movement of the lever will impart a turning motion to the associated disk and will therefore impart a turning motion to the shaft 54. Maximum turning force is achieved when the linear bearing is in the 90° position illustrated in FIG. 3*b*. When the same lever has achieved the 180° position shown in FIG. 3*c*, continued rearward movement of the lever will continue to impart a slight rotational movement to the disk 80 as indicated by the arrow. Thus, when one lever is in the 0° position and the other lever is in the 180° position, it is possible to impart a turning motion to the shaft 54. Finally, when the linear bearing is in the 270° position, as illustrated in FIG. 3*d*, forward motion to the lever will continue to impart rotational movement to the shaft 54. The forward dead spot for the levers 56, 58 are at a position where the linear bearing is in a right angle position to lines extending from the centerline of the shaft 54 through the center of the linear bearing and then to the center of the mounting assembly 74, this position being approximately 345° in the forward position and approximately 195° in the rear position. Because of this offset drive relationship, it is always possible to propel the wheelchair with the arm-drive means. However, as a practical matter, if the levers are near a dead space position, it is easiest to start the wheelchair in a forward direction by engaging one or both of the handgrip rings 82 which are secured to the drive wheels 16, 18 to get the wheelchair moving and to then start reciprocating the levers to continue the forward motion, inertia carrying the levers past their respective dead spots.

Steering Means

The steering means of the present invention consists essentially of the right and left brake means which are capable of individually braking the right and left wheels 16, 18 to affect turning. Thus, if the right wheel 16 is braked and forward power is directed to the left wheel 18, the wheelchair will turn in a right-hand direction. The brake means 62 includes a brake-applying lever 84 associated with each of the handgrips 72.1, the brake-applying lever being interconnected with a caliper brake mechanism 86 of the type conventionally used with handgrip-braking bicycles, the brake-applying lever 84 being connected with the brake mechanism 86 by means of a brake cable 88. While the upper lever portion 72 can be removed from the lower lever portion 74, it is not necessary to disconnect the brake lever 84 from the brake mechanism as there is a sufficient length of cable 88 between the parts to permit stowage of the lever 68 at any convenient location.

Leg-Drive Means

The leg-drive means 60 includes a telescopic housing assembly indicated generally at 92, the telescopic housing assembly supporting at its forward end a transversely extending crank or drive shaft 94 which has right and left crank arms 96.1, 96.2 secured thereto. The crank arms support right and left foot pedals 98.1 and 98.2, respectively.

Figure 2:
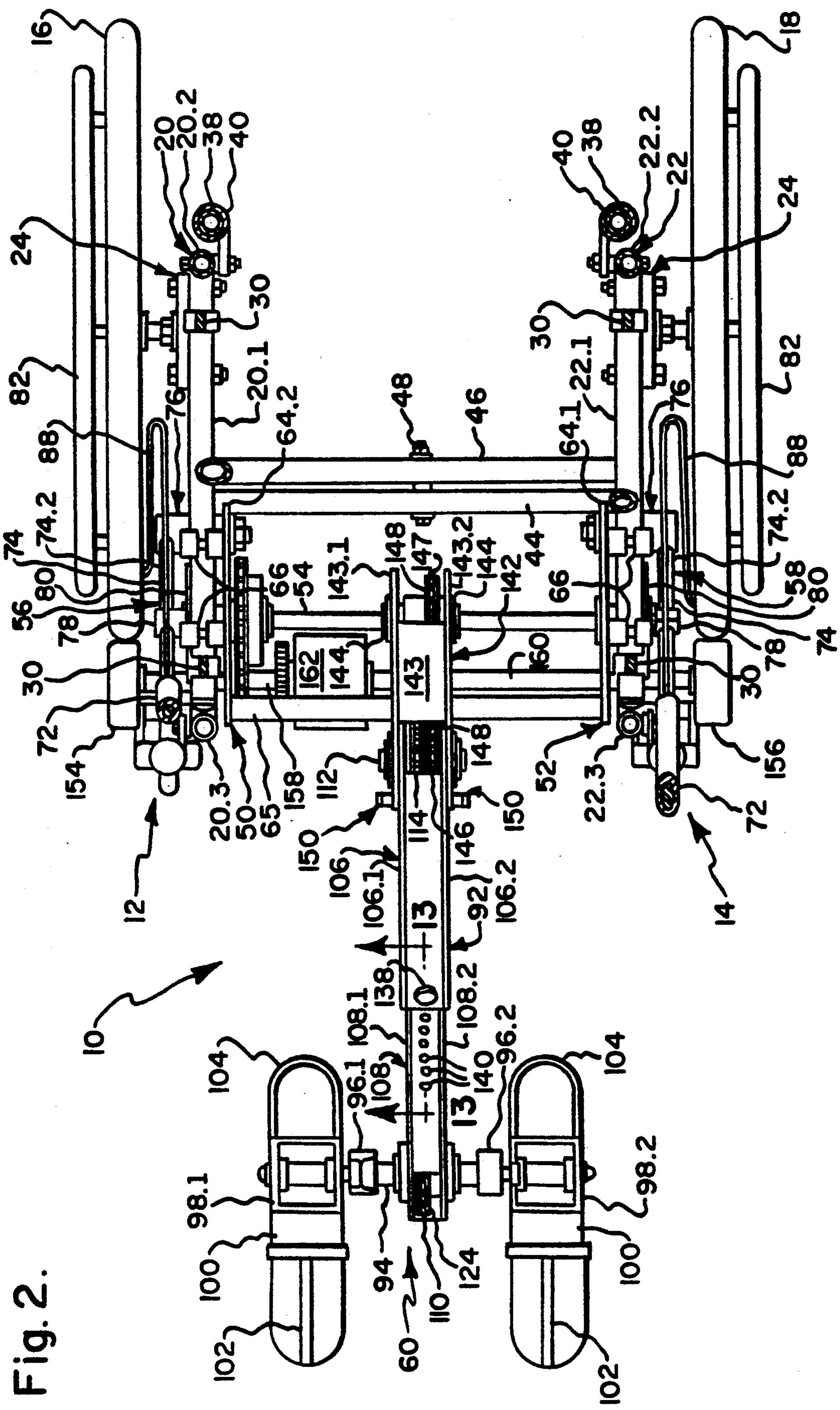
FIG. 2 is a top sectional view taken generally along the line 2—2 in FIG. 1.

While conventional pedals 98.1 and 98.2 are employed in both embodiments, it may be desirable to add full foot supports as shown in FIGS. 1 and 2. The full foot support includes a sole plate 100 which has mounted thereon suitable toe and heel clips 102, 104, respectively. Such an attachment will ensure that the feet be maintained on the pedals for patients who have no control of their feet. In order to provide for stowage of the telescopic housing assembly underneath the seat of the wheelchair, as will be necessary when performing a lateral transfer of the patient, one of the crank arms 96.1 or 96.2 may be rotated 180° so that it lies parallel to the other crank arm, the stowage position being shown in FIG. 16. At this point, it should be observed that as the seat and back of the wheelchair are not provided with fore and aft adjustment. Since the users of the wheelchair may have differing leg lengths, it is desirable to provide a drive means which is adjustable in length so that a single drive means may be provided for users having differing leg lengths. To this end an extendible and retractable drive is provided which is mounted in the telescopic housing. The telescopic housing assembly 92 includes a first housing assembly 106, and a second housing assembly 108 secured to the first housing assembly for telescopic adjustment thereto.

Each of the housing assemblies 106, 108 include two clam-shell parts, one part acting as a support for various shafts, the support part being indicated by the suffix ".1", and the other part serving primarily as a cover, this part being indicated by the suffix ".2". Thus, the second support housing 108.1 rotatably supports the crank or drive shaft 94 at the location spaced away from the first housing 106, the shaft 94 having a drive sprocket 110 mounted thereon for rotation therewith. The first housing support 106.1 is supported about a driven shaft 112 in FIGS. 1 through 3 and about the common input shaft 54 in FIGS. 17 through 19. Further mention of this will be made below. A driven sprocket 114 is secured to the associated driven shaft 112 or 54 for rotation therewith. The support housing 106 is journaled about the associated driven shaft 112 or 54 for swinging movement and can be held in various positions of adjustment in a manner which will be more fully brought out below.

The first housing support portion 106.1 as well as cover portion 106.2 supports a first stub shaft 116 on which is mounted a first idler sprocket 118. Similarly the second housing support portion 108.1 and cover 108.2 supports a second stub shaft 120 on which is mounted a second idler sprocket 122. A chain 124 is disposed over the various sprockets 110, 114, 118, and 122 and when the crank shaft 94 is caused to be rotated by rotary motion of the pedals 98 it will impart rotary motion to the associated driven shaft 54 or 112. Alternatively, if the associated shaft 54 or 112 is caused to be rotated through the action of the arm-drive means 56, 58, the pedals will in turn be caused to be rotated. By selection of proper gearing, rotational movement of the pedals will be, maintained in synchronism with the arm-drive means. While not previously mentioned, a further stub shaft 126 and idler sprocket 128 are also mounted on the second housing portion 108. This will ensure that one flight of the chain 124 does not interfere with another flight of the chain as it passes over the sprocket 118. As can be seen from FIGS. 4 and 7, the housing portion 108.1 and 108.2 are provided with elongated slots 130 which receives the stub shaft 116 so that the second housing 108 can be moved relative to the first housing 106. When this occurs, as for example when moving from a retracted position shown in full lines in FIG. 4 to an extended position shown in phantom lines in FIG. 4, the distance from the sprockets 110 and 114 will be increased, but the distance between the sprockets 118 and 120 will be decreased the same amount as the sprocket 122 moves towards the sprocket 116. By providing the drive as illustrated it is possible to extend and retract the telescoping housing to provide for people with differing leg lengths.

The housings can be held in their desired positions of adjustment by means of a pin 132 (FIG. 13) which is normally biased to an extended position by a spring 134 in housing 136, which spring can be moved to a retracted position by engagement with a button 138 to move the pin out of one of a plurality of aligned adjustment apertures 140 formed in the support housing 108.1. The operation of the adjustment mechanism should be apparent from FIG. 13.

Drive Extension—First Embodiment

As previously noted the telescopic housing means 92 of the leg drive means is connected to an intermediate drive shaft 112 in the first embodiment whereas in the second embodiment it is connected directly to the common input shaft 54. In the first embodiment the intermediate drive shaft 112 is supported by a drive extension indicated generally at 142. The drive extension includes a clam-shell housing 143 having a primary support portion 143.1 and a cover 143.2. The housing parts 143 are in turn supported at their rear end by the common input shaft 54 and at an intermediate portion by the fixed shaft rod 65. To this end, at least one of the portions 143.1, 143.2 is provided with a suitable support bearing 144. In order to have the leg-drive means of the first embodiment drivingly connected to the common input shaft a further sprocket 146 is mounted on the driven shaft 112 for rotation therewith and another sprocket 147 is secured to the common input shaft 54 in line for the sprocket 146. A chain 148 is passed over the sprockets 146 and 147 to cause shafts 112 and 54 to rotate together.

An adjusting mechanism indicated generally at 150 (FIG. 2) is mounted on the forward end of each of the clam-shell portions 143.1 and 143.2 which may be used to hold the housing assembly 92 in various positions of angular adjustment two of which positions are illustrated in FIGS. 1 and 16. The adjusting mechanisms 150 are identical with the adjusting mechanism 132 through 138 and cooperate with suitable apertures 152 in the first housing assembly 106.1 and 106.2, only the apertures in the clam-shell cover 106.2 being illustrated.

Resistance Means—First Embodiment

The resistance given to the rotation of shaft 54 which is caused by motion of either the right arm-drive means 56, the left arm-drive means 58, or the leg-drive means 60 (or any combination thereof), can be created in a number of ways. Thus, if the chair is to be used as a stationary exerciser, it is only necessary to connect an adjustable resistance device to the common shaft 54, such an adjustable resistance device being a disk and disk brake, which disk is driven by the shaft 54, a magnetic field device such as an electrical generator with a variable resistance load, an aerodynamic resistance device such as a fan, or any other such suitable device as may occur to those skilled in the art. In addition to such a resistance device, which are well known from stationary exercise bicycles, the present invention also contemplates applying resistance by providing a drive for propelling the wheelchair in a forward direction.

One form of propulsion device is illustrated in the first embodiment and consists of right and left friction-wheel drives 154, 156, respectively, which engage the rubber tread on the right and left drive wheels 16, 18, respectively, of the wheelchair. The right and left friction drive wheels 154, 156 are in turn mounted on the ends of right-hand and left-hand output drive shafts 158, 160, respectively. The shafts 158 and 160 in turn extend outwardly from an intermediate differential 162. The differential is in turn driven through an input gear 164 which is in turn driven from the output gear 166 of a change-gear transmission 168. The transmission 168 is of the type typically found in three-speed bicycles and will provide three or more output speeds, the speed being selected by shift lever 169. The transmission is driven by an input shaft 170 and when the shaft 170 is caused to be rotated in one direction, for example a counterclockwise direction when viewed from the left side, as shown in FIG. 1, the output gear 166 will be driven. However, the transmission 168 is of the type that will free wheel. Thus, when the shaft 170 is rotated in an opposite direction, for example clockwise as shown in FIG. 1, there will be no output to the gear 166 as a one-way or overrunning clutch mechanism is employed within the transmission 168. The input shaft 170 is in turn caused to be driven by a sprocket and chain mechanism including chain 172 and input and output sprockets 174, 176, respectively. The input sprocket 174 is secured to the common shaft 54 for rotation therewith. Similarly, the sprocket 176 is secured to the input shaft 170 of the transmission for rotation therewith.

Lateral Transfer

It is a feature of the present invention that the exercising attachment can be mounted on the wheelchair without affecting normal lateral transfer of the user to or from the wheelchair. To accomplish this the housing 92 and the foot pedals 98 must be stowed underneath the wheelchair. One of the lever assemblies 72, 74 must be split with the upper portion 72 being placed in a stowed position. Finally, it will be necessary to move an arm rest 38 also to a position where it will not affect lateral movement of the user. These various positions are shown in FIG. 16. After a user of the wheelchair has transferred onto the wheelchair, it is then necessary to properly reposition the various parts. This is done simply by raising and swinging the arm rest 38 to its forward position and then forcing it down so that it will be held in its forward position. The upper tubular intermediate portion 72.2 will then be telescoped about the lower intermediate portion 74.2 and the housing 92 will be swung to its normal operating position and pinned in place, the pedals 98 then being properly positioned. If the user has leg mobility, he will then place his feet upon the pedals. If necessary the user's feet can be secured onto sole plates 100 by toe and heel clips. The handgrips 72.1 will be engaged and, if they are in an intermediate position, as for example the positions shown in FIGS. 3*b* and 3*d*, it is only necessary to pull on one of the handgrips to initiate forward movement of the wheelchair. This movement will be transmitted to the pedals and provide proper exercise to the lower limbs in the case of a patient not having movement of the lower limbs. Alternatively, if the patient has movement of the lower limbs, coordinated movement between the arms and legs is achieved as all motions are commonly transmitted through the common input shaft 54. The gearing is so selected that either synchronous or asynchronous bilateral movement may be achieved. While the resistance means shown in FIGS. 1 through 16 is the resistance imparted by forward motion, in some cases it may be desirable to use the apparatus of this invention in a stationary manner. To this end the handgrips will be reciprocated initially in a backwards manner as well as the pedals 98. As a transmission 168 utilized has an overrunning clutch mechanism, this motion will not impart any forward motion to the wheelchair and suitable resistance means of the type typically used with stationary exercise bicycles may be employed. Thus, a disk may be mounted on the shaft 54 which can be engaged by a suitable caliper brake, or any other suitable mechanism, including air resistance means, may be employed to provide a suitable resistive effort to the operation of the pedals and handgrips.

Steering Brakes Mounting—First Embodiment

In the first embodiment, the caliper brake mechanisms 86 are pivotally mounted on eye bolts 182 which are suitably secured to the lower end of each of the right and left plates 64. If one desires to turn in the right-hand direction, it is only necessary to engage the right-hand pivoted lever 84 to cause the right-hand caliper brake to engage the right-hand drive wheel 16. The force imparted from the drive shaft 54 will now pass through the differential 162 and drive the other wheel at a faster rate than the one being braked to affect a turning motion.

Second Embodiment

While some differences between the first and second embodiments have been discussed above, the second embodiment of FIGS. 17 through 21 differs from the first embodiment primarily in the manner in which the wheelchair may be driven to impart a resistance to the turning of the input shaft 54. Thus, in the second embodiment the propulsion means which imparts a resistance is a fifth wheel 184, the fifth wheel trailing under the chair. The fifth wheel is mounted upon a transmission 186 in the same manner that a bicycle wheel is mounted on its hub transmission. The transmission is in turn supported by stub shafts 188 in turn received by slotted ends of a fork 190. The transmission 186 controlled by a conventional Bowden wire mechanism 192, the upper controlling shift lever mechanism not being illustrated in FIGS. 17 through 19. The transmission 186 may also include an overrunning clutch to permit the pedals or hand levers to be moved in an opposite direction without imparting a forward motion to the fifth wheel 184. The axis for the fifth wheel 184 is indicated by the broken line 194 in FIG. 18. In order to prevent scuffing of the fifth wheel 184 during turns, it is desirable that the axis 194 be in line with the axis 196 of the rear wheels 16, 18 when viewed from above as shown in FIG. 16.

The fork 190 is the rear portion of a rear trailing arm assembly or housing, indicated generally at 198, which is of a dog-leg shape. Its upper forward end portion 200 is journaled for pivotal motion about the common input shaft 54. The means for imparting rotary motion to the fifth wheel include a sprocket 202 secured the shaft 54, an intermediate shaft 204, a pair of sprockets 206 and 208 carried by the intermediate shaft 204 for rotation therewith, and one more sprocket 210 suitably connected with the input shaft of transmission 186 to act as the input therefore. When the shaft 54 is rotated, it will cause corresponding rotation of the sprocket 202, which will in turn cause sprockets 206 to rotate due to the provision of a chain 212. The chain 212 is suitably tensioned by a tension idler 214 Finally, a further chain 216 is provided which is driven by sprocket 208 the chain in turn driving sprocket 210. It is not necessary to provide a chain tension idler for this chain as the tension on the chain 216 can be suitably adjusted by moving the sprocket 210, along with transmission 186 towards and away from the shaft 214 within the slots of the fork ends.

Biasing means indicated generally at 218 are provided to ensure that the fifth wheel 184 engages the surface of the ground with sufficient force to propel the chair in a forward direction. The biasing means includes an eye bolt 220 or the like which has its eye end disposed about a stub shaft 222 between the forks of the rear portion 190 of the trailing arm assembly 198. This shaft is positioned just forwardly of the fifth wheel 184 as can best be seen in FIG. 18. The upper end of the eye bolt 220 passes through a frame member or bracket 224, the ends of which are secured to the plates 64.1 and 64.2. A washer or the like 226 is provided on an intermediate portion of the eye bolt between the frame member 224 and the shaft 220 and a spring 228 is provided above the washer 226, which spring wears against the washer 226 and the frame member 224 to force the rear trailing arm assembly downwardly. The washer may be held in position by a sleeve 229. A torsional spring, around the drive shaft, could be used instead of this type of "suspension".

The operation of the second embodiment is essentially the same as the operation of the first embodiment. The mounting of the chain housing 92 to the shaft 54 differs as has been previously indicated, and it is adjustably positioned by means of a long bolt 230 which passes through suitable apertures 232 in the upper forward end of the upper forward portion 200 and corresponding aperture 234 in the first housing assembly 106. The second embodiment does not show the sole plates 100, merely showing right and left pedals 98.1, 98.2. However, if the user of the wheelchairs needs or requires such sole plates with the heel and toe clips, they can be readily added to the pedals shown. In the second embodiment the lever mounting assembly 76 is moved forwardly of the location shown in the first embodiment to provide better ergonomics. The second embodiment also differs from the first embodiment in that the brake caliper 86 is carried by a bracket 236 which is in turn secured to a lower portion 20.4 or 22.4 of the frame assembly.

Figure 17:
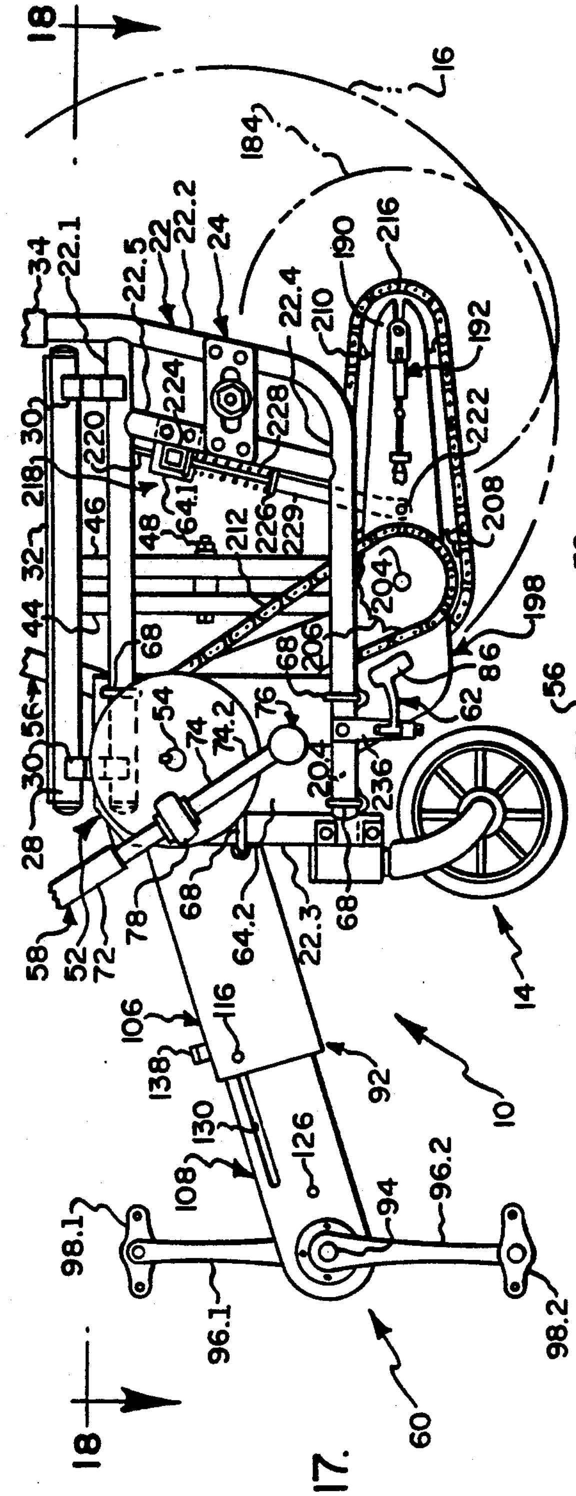
FIG. 17 is a partial side elevational view similar to FIG. 1 but illustrating a second form of the four-limb exercising attachment of the present invention.
Figure 19:
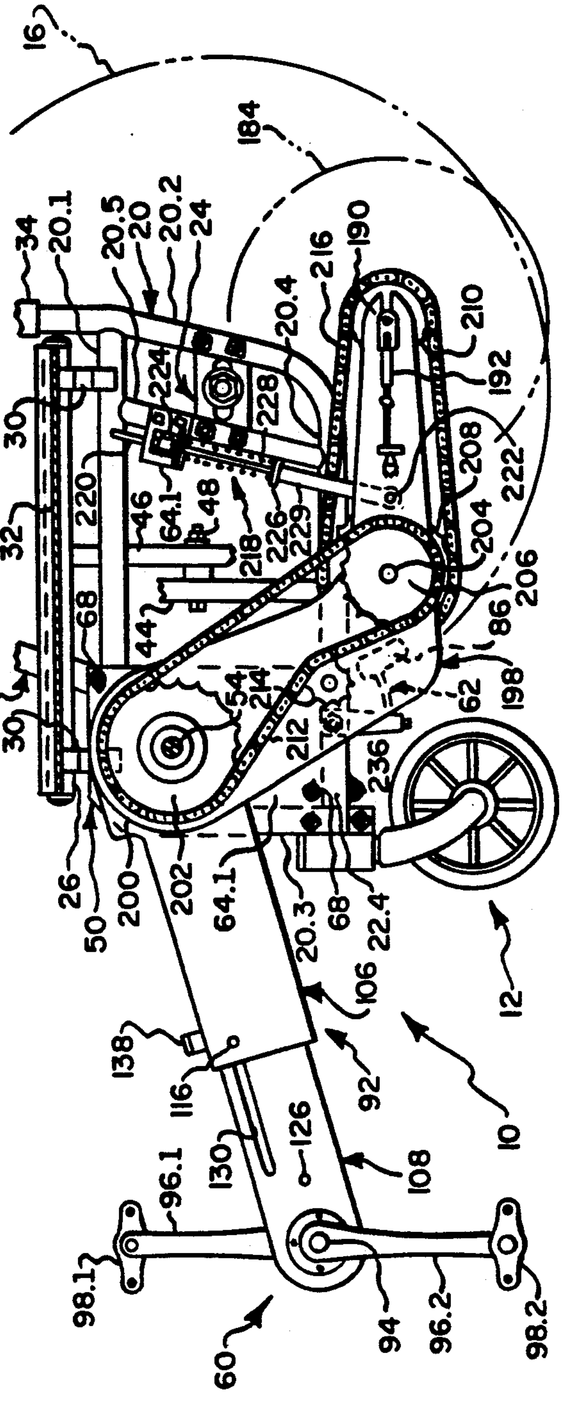
FIG. 19 is a side elevational section taken generally along the line 19—19 in FIG. 18, parts being eliminated for purposes of clarity.
Figures 18, 20, 21:
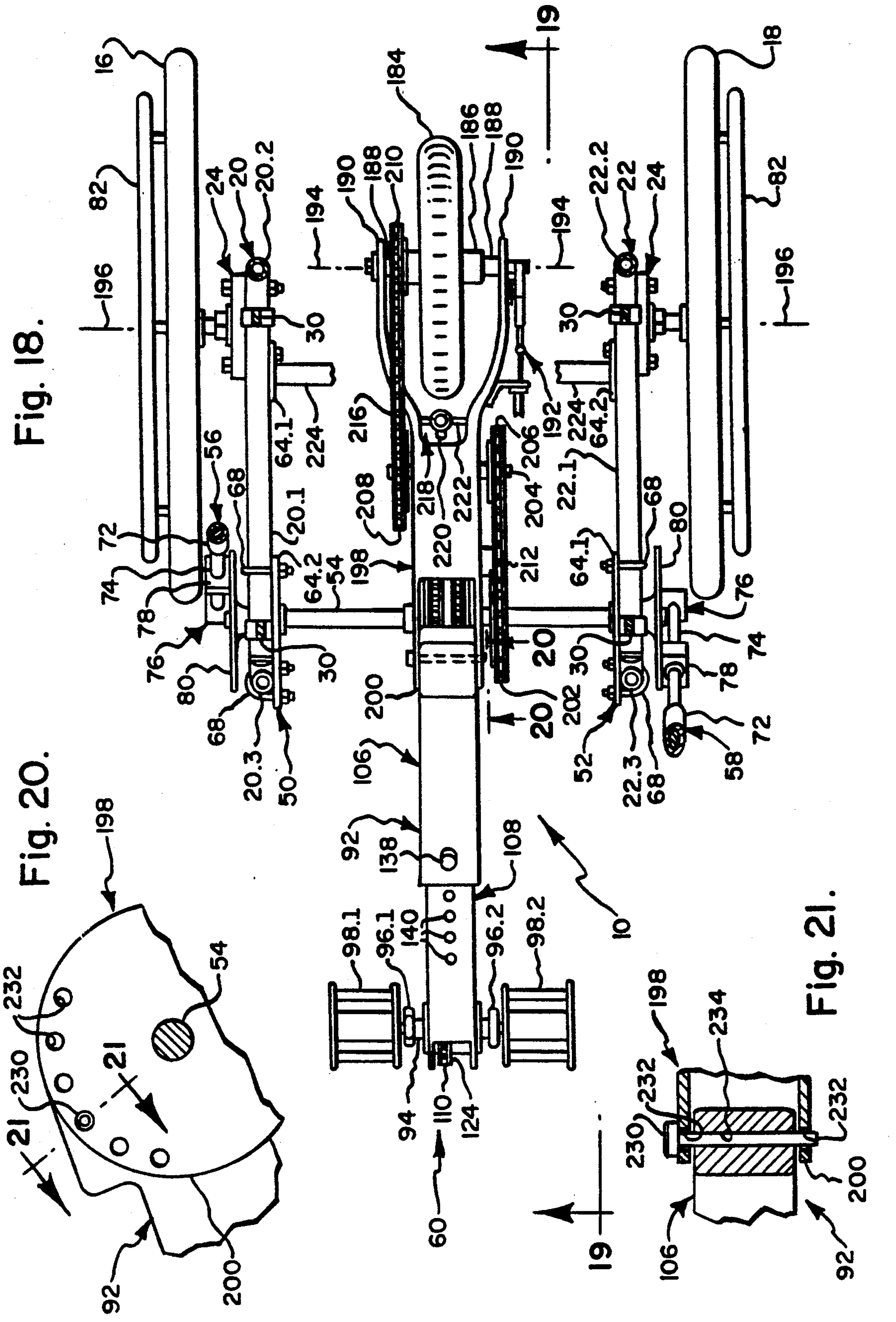
FIG. 18 is top sectional view taken generally along the lines 18—18 of FIG. 17.
FIG. 20 is an enlarged detailed view taken generally along the line 20—20 in FIG. 18.
FIG. 21 is a sectional view taken generally along the line 21—21 in FIG. 20.

It has been found through testing that the embodiment illustrated in FIG. 1 provides greater resistance to the turning of the input shaft 54 than the design shown in the second embodiment. This is believed to be due primarily to the inefficiencies of the friction-wheel drives 154, 156. Also, as the drive is more complicated, there are the inefficiencies of a more complicated drive mechanism. Thus, it has been found in many situations that the vehicle shown in the first embodiment need not be provided with any further resistance means when utilized in a stationary manner. It has also been found that the version shown in FIGS. 17 through 19 is also suitable for relatively rapid movement from one location to another, particularly for those who have use of their legs. Thus, when the attachment shown in the second embodiment has been mounted on a standard wheelchair, it has been possible for an average male college student to maintain speeds in the neighborhood of 10 miles per hour with very little (or minimal) effort. In order to reduce the added weight of the attachments, suitable low weight materials are utilized.

Finally, the present apparatus may also be utilized with functional electrical stimulation, if desired.

While two preferred forms of the present invention have been illustrated and described above, it should be apparent that various modifications may be made. Accordingly, applicant does not intend to be limited to the particular details shown and described above, but that, it will be understood that the foregoing description and illustrations are by way of example only, and that such modifications and changes as may suggest themselves to those skilled in the art are intended to fall within the scope of the present invention as defined by the appended claims.

What is claimed is:

1. A four-limb exercising attachment for wheelchairs of the type having right and left front and rear wheels and a seat between the wheels, which attachment can be added onto existing wheelchairs without affecting normal lateral transfer of the user to or from the wheelchair after the attachment has been added to the wheelchair and which will ensure synchronous movement of arms and legs during exercising movement, which exercising movement may also be used to propel the wheelchair in a forward direction; said attachment comprising:

right and left mounting assemblies securable to right and left portions of a wheelchair, respectively;

a common input shaft extending between the right and left mounting assemblies;

right and left arm drive means for imparting rotary motion to the input shaft, the right arm drive means being connected to the right mounting assembly, and the left arm drive means being connected to the left mounting assembly;

means for releasing a portion of one of the right and left arm drive means so that it may be temporarily removed during normal lateral transfer of the user to or from the seat;

leg drive means connected to the common input shaft for imparting rotary motion to the input shaft; and resistance means for imparting a resistance to the turning of the input shaft.

2. The attachment as set forth in claim 1 wherein the leg drive means includes a crankshaft which is movable towards and away from the common input shaft.

3. The attachment as set forth in claim 1 wherein the resistance means includes an output drive shaft assembly interconnected with the input shaft and propulsion means for propelling the wheelchair in a forward direction, the propulsion means being connected to the output drive shaft assembly.

4. The attachment as set forth in claim 3 wherein the propulsion means includes a fifth wheel trailing under the chair to propel it and fifth-wheel drive means interconnecting the fifth wheel with the output drive shaft assembly.

5. The attachment as set forth in claim 4 further characterized by the provision of right and left brake means engageable with the right and left rear wheels of the wheelchair, respectively, and wherein the fifth wheel lies between the right and left rear wheels.

6. The attachment as set forth in claim 4 wherein the fifth wheel is carried by a rear portion of a rear trailing arm assembly, the forward end portion of which is pivotally connected to the output drive shaft assembly, and wherein biasing means are provided for biasing the fifth wheel into engagement with the surface of the ground.

7. The attachment as set forth in claim 6 wherein the resistance means further includes a change gear transmission carried by a rear portion of the trailing arm assembly, the change gear transmission having an output shaft connected to the fifth wheel and an input connected to the output drive shaft assembly.

8. The attachment as set forth in claim 1 wherein each of the right and left arm drive means includes a lever having an upper handgrip portion movable between forward and rear positions a lower end portion pivotally connected to an associated mounting assembly and an intermediate portion, a linear bearing engageable with in intermediate portion of the lever for sliding movement thereon, and linear bearing mounting means for mounting the linear bearing for rotational movement about a transversely extending axis, the linear bearing mounting means being interconnected with the input shaft to cause rotational movement of the input shaft as the associated lever is pivoted between forward and rear positions.

9. The attachment as set forth in claim 1 wherein right and left manually engageable brake means are provided for engagement with the right and left rear wheels, respectively, and wherein each of the right and left arm drive means includes a lever having an upper handgrip portion, brake applying means being associated with the handgrip for each of the right and left levers for applying the brake means to the associated right and left brakes, respectively.

10. The attachment as set forth in claim 1 wherein the leg drive means is swingable between a forward use position and a rear stowed position where it may be stowed underneath the wheelchair during transfer of the user to and from the wheelchair, the attachment further including means to hold the leg drive means in a desired position.

11. The attachment as set forth in claim 1 wherein each of the right and left mounting assemblies includes at least three spaced apart saddle-bracket assemblies securable to spaced apart portions of the wheelchair frame.

12. A four-limb exercising attachment for wheelchairs of the type having right and left front and rear wheels, which attachment can be added onto existing wheelchairs without affecting normal lateral transfer of the user to or from the wheelchair and which will ensure synchronous movement of arms and legs during exercising movement, which exercising movement may also be used to propel the wheelchair in a forward direction; said attachment comprising:

right and left mounting assemblies securable to right and left portions of a wheelchair, respectively;

a common input shaft extending between the right and left mounting assemblies;

right and left arm drive means for imparting rotary motion to the input shaft, the arm drive means being interconnected to the right and left mounting assemblies, respectively;

leg drive means connected to the common input shaft for imparting rotary motion to the input shaft, the leg drive means including a first housing, a second housing secured to the first housing for telescopic adjustment, a crankshaft carried by the second housing at a location spaced away from the first housing, and opposed outwardly extending crank arms and pedals secured to the crankshaft for engagement by the feet of the user; and resistance means for imparting a resistance to the turning of the input shaft.

13. The attachment as set forth in claim 12 further including a drive sprocket secured to the crankshaft, a driven sprocket secured to the common input shaft, a first idler sprocket carried by the first housing, a second idler sprocket carried by the second housing, the second idler being nearer to the common input shaft than the first idler at all positions of telescopic adjustment of the second housing, and a chain passing from the drive sprocket to the driven sprocket and then over the first idler sprocket and then over the second idler sprocket and back to the drive sprocket.

14. A four-limb exercising attachment for wheelchairs of the type having right and left front and rear wheels, which attachment can be added onto existing wheel chairs without affecting normal lateral transfer of the user to or from the wheelchair and which will ensure synchronous movement of arms and legs during exercising movement, which exercising movement may also be used to propel the wheelchair in a forward direction; said attachment comprising:

right and left mounting assemblies securable to right and left portions of a wheelchair, respectively;

a common input shaft extending between the right and let mounting assemblies;

right and left arm drive means for imparting rotary motion to the input shaft, the arm drive means being interconnected to the right and left mounting assemblies, respectively;

leg drive means connected to the common input shaft for imparting rotary motion to the input shaft; and resistance means for imparting a resistance to the turning of the input shaft, wherein the resistance means includes an output drive shaft assembly interconnected with the input shaft and propulsion means for propelling the wheel chair in a forward direction, the propulsion means being connected to the output drive shaft assembly, and wherein the propulsion means includes right and left friction drive wheels mounted on the right and left ends of the output drive shaft assembly, each of the friction drive wheels being in driving contact with one of the right and left rear wheels of the wheelchair.

15. The attachment as set forth in claim 14 wherein the output drive shaft assembly includes right-hand and left-hand output drive shafts and an intermediate differential.

16. The attachment as set forth in claim 15 further characterized by the provision of steering means, said steering means including right and left manually operable brake means engageable with the right and left rear wheels, respectively.

17. The attachment as set forth in claim 16 wherein the resistance means further includes a change gear transmission having input and output portions connected to the input drive shaft assembly and the differential, respectively.

18. The attachment as set forth in claim 17 wherein the change gear transmission includes a one-way drive mechanism so that the change gear transmission will drivingly engage the differential when the input portion is rotated in one direction, and will not drive the differential when in input portion is rotated in another direction so that the user of the wheelchair may use the exercising attachment either without propelling the wheelchair by causing the input shaft to be rotated in one direction or with propulsion of the wheelchair by causing the input shaft to be rotated in the other direction.

19. An extendible and retractable drive mechanism comprising:

first and second relatively movable housings which can be telescopically adjusted with respect to each other, each housing have first and second ends, the first ends being remote from each other;

a drive shaft rotatably journaled within the first end of the first housing;

means secured to the drive shaft for imparting rotary motion thereto;

a driven shaft rotatably journaled with in the first end of the second housing;

drive and driven sprockets connected to said drive and driven shafts for rotary movement therewith;

a first idler sprocket carried by the first housing;

a second idler sprocket carried by the second housing, the second idler sprocket being nearer to the driven shaft than the first idler sprocket at all positions of telescopic adjustment of the first and second housings; and a chain passing from the drive sprocket to the driven sprocket and then over the first idler sprocket and then over the second idler sprocket and then back to the drive sprocket.

20. The extendible and retractable drive mechanism as set forth in claim 19 wherein the drive shaft has opposite ends, and wherein the means for imparting rotary motion to the drive shaft are opposed outwardly extending crank arms secured to the opposite ends of the drive shaft.

* * * * *